(No Model.) 5 Sheets—Sheet 1.
G. P. SPOONER.
MAGAZINE PHOTOGRAPHIC CAMERA.
No. 522,921. Patented July 10, 1894.

Witnesses
John Lawrie
G. W. Rea.

George P. Spooner
By James L. Norris
his Attorney

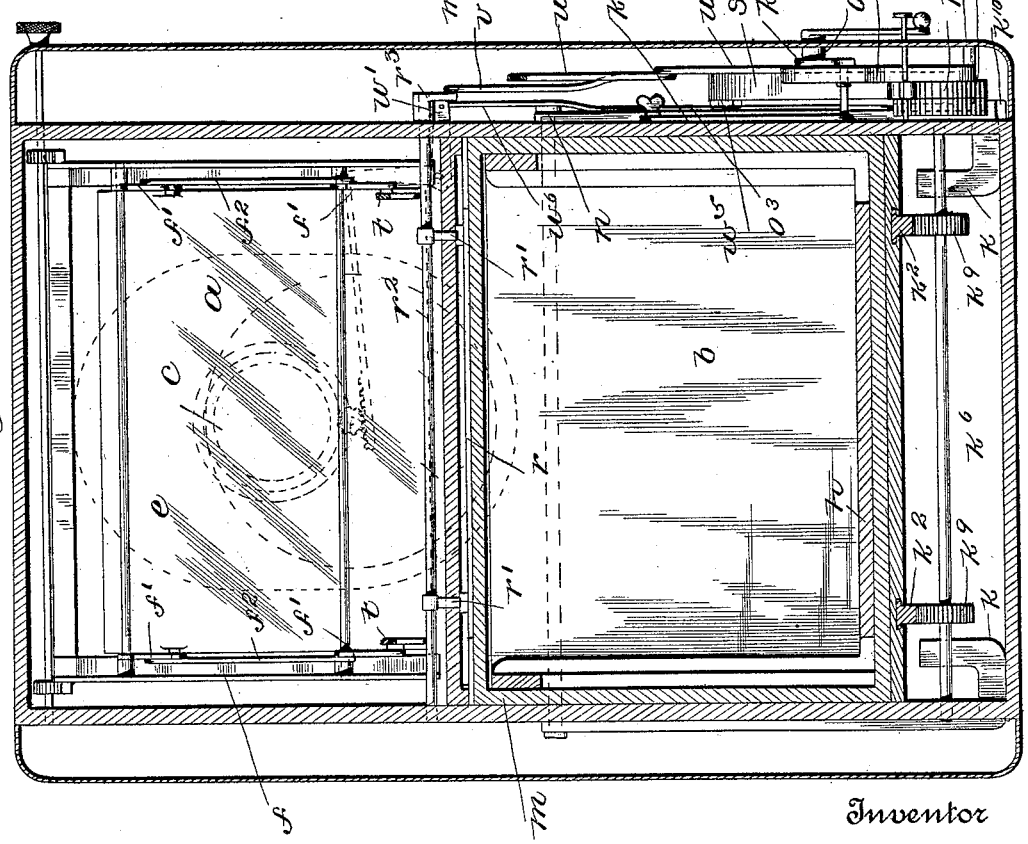

(No Model.) 5 Sheets—Sheet 3.
G. P. SPOONER.
MAGAZINE PHOTOGRAPHIC CAMERA.
No. 522,921. Patented July 10, 1894.
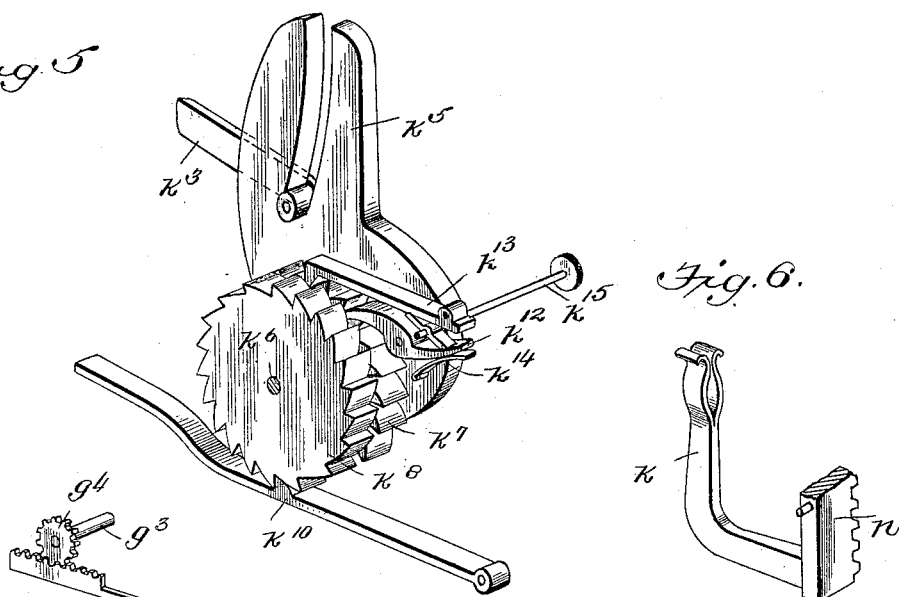
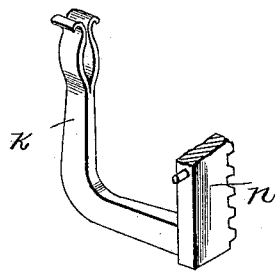
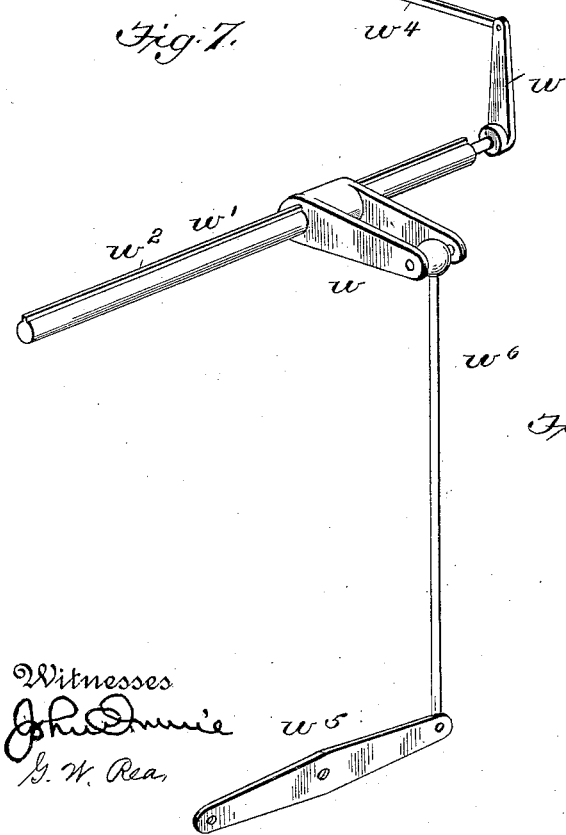
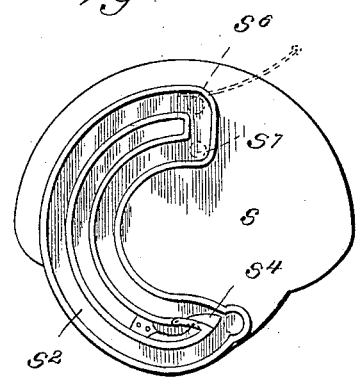
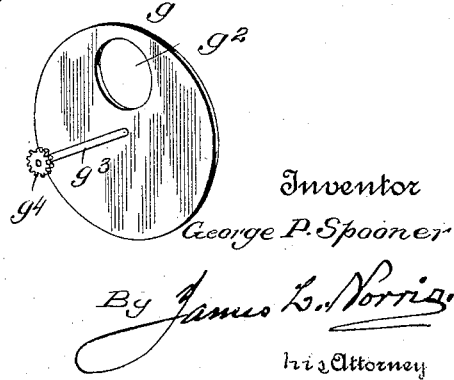
Witnesses
Inventor
George P. Spooner
By James L. Norris
his Attorney (No Model.) 5 Sheets—Sheet 4.
G. P. SPOONER.
MAGAZINE PHOTOGRAPHIC CAMERA.
No. 522,921. Patented July 10, 1894.
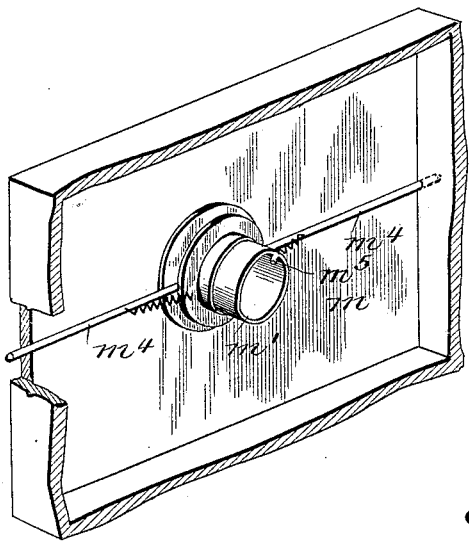
Fig. 10.
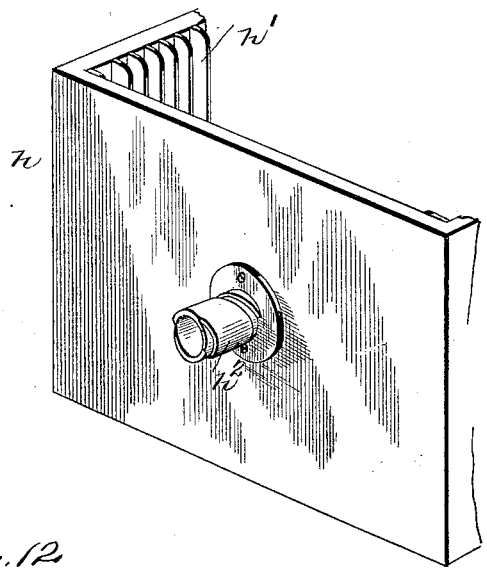
Fig. 11.
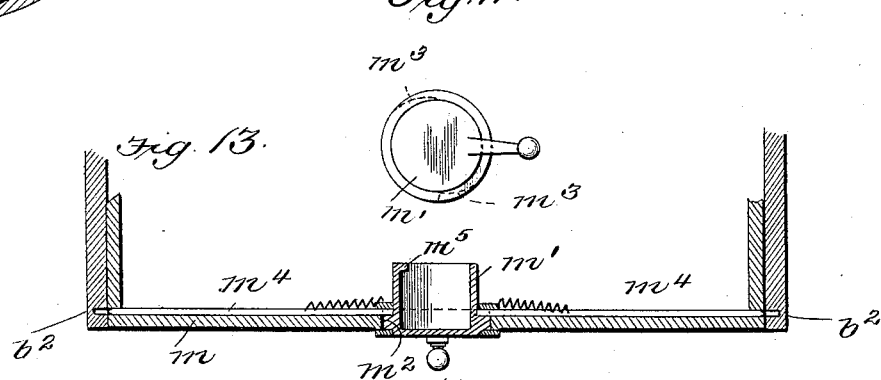
Fig. 12.
Fig. 13.
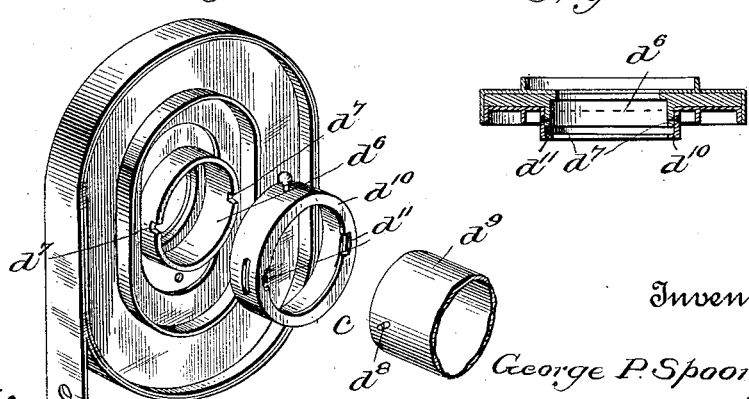
Fig. 14.
Fig. 15.
Witnesses
John P. Dinnie
G. W. Rea.
Inventor
George P. Spooner
By James L. Norris.
his Attorney

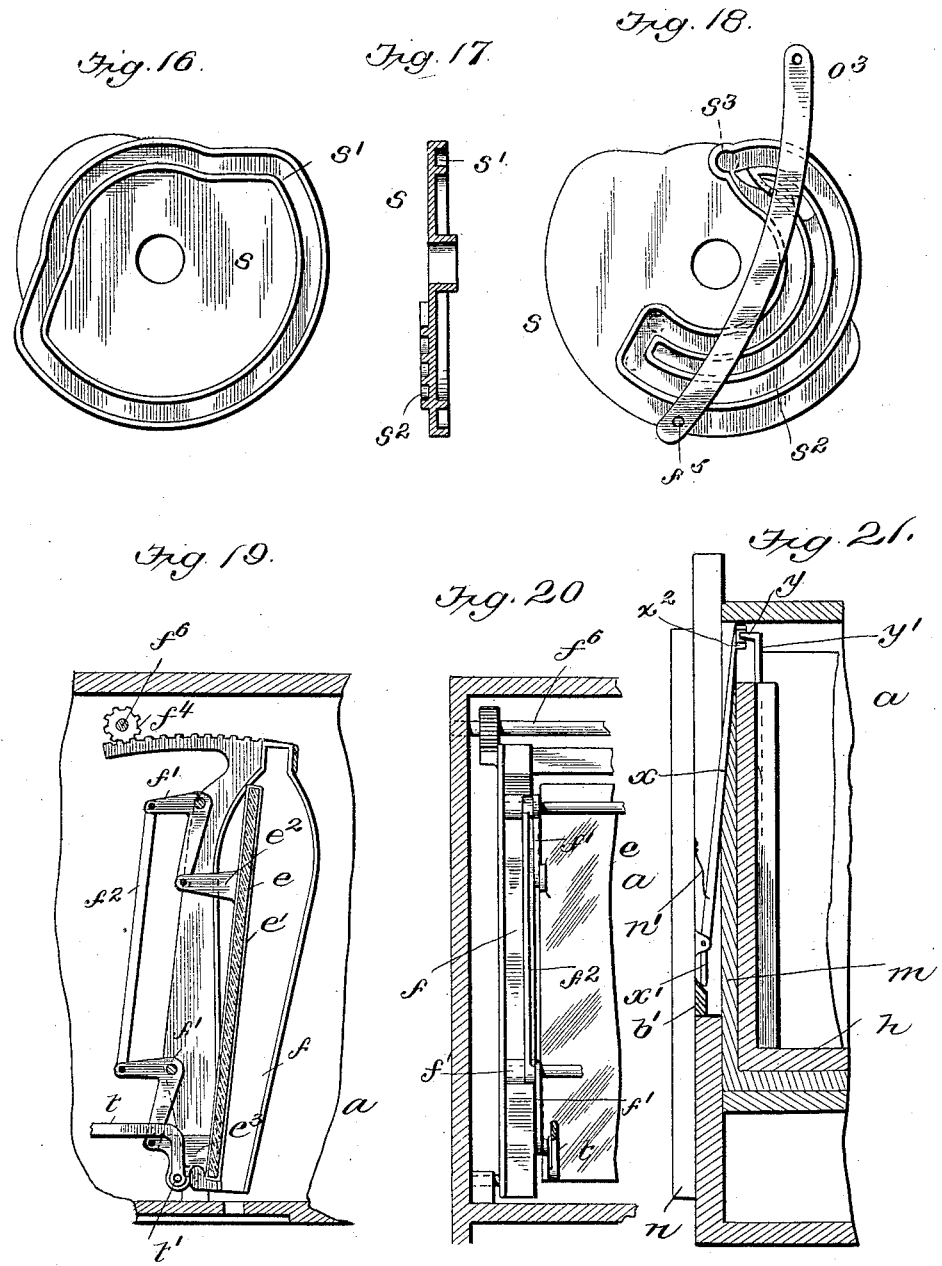

United States Patent Office.

GEORGE PERCIVAL SPOONER, OF BRON-Y-GARTH, ENGLAND.

MAGAZINE PHOTOGRAPHIC CAMERA.

SPECIFICATION forming part of Letters Patent No. 522,921, dated July 10, 1894

Application filed March 1, 1892. Serial No. 423,419. (No model.) Patented in England March 24, 1891, No. 5,218.

*To all whom it may concern:*

Be it known that I, GEORGE PERCIVAL SPOONER, civil and mechanical engineer, a subject of the Queen of Great Britain, residing at Bron-y-Garth, Portmadoc, North Wales, England, have invented new and useful Improvements in Magazine Photographic Cameras, (for which I have obtained a patent in Great Britain, No. 5,218, bearing date March 24, 1891,) of which he following is a specification.

My invention relates to certain new and useful improvements in magazine photographic cameras of that class wherein the plates to be exposed are stored within a removable magazine and are successively and automatically transferred from the magazine to the exposing chamber and after exposure are returned to the magazine, the operation being repeated until all the plates have been exposed, when the magazine may be detached from the camera, the exposed plates removed therefrom, and new plates substituted.

The object of the invention is to provide a camera of this character wherein all the operations necessary for shifting the plates, focussing the lens and effecting the exposure may be performed with ease, rapidity and certainty, and to these ends consists in the novel construction, arrangement, and combination of parts hereinafter fully described and definitely pointed out in the claims following the description, due reference being had to the accompanying drawings forming a part of this specification, wherein—

Figure 1:
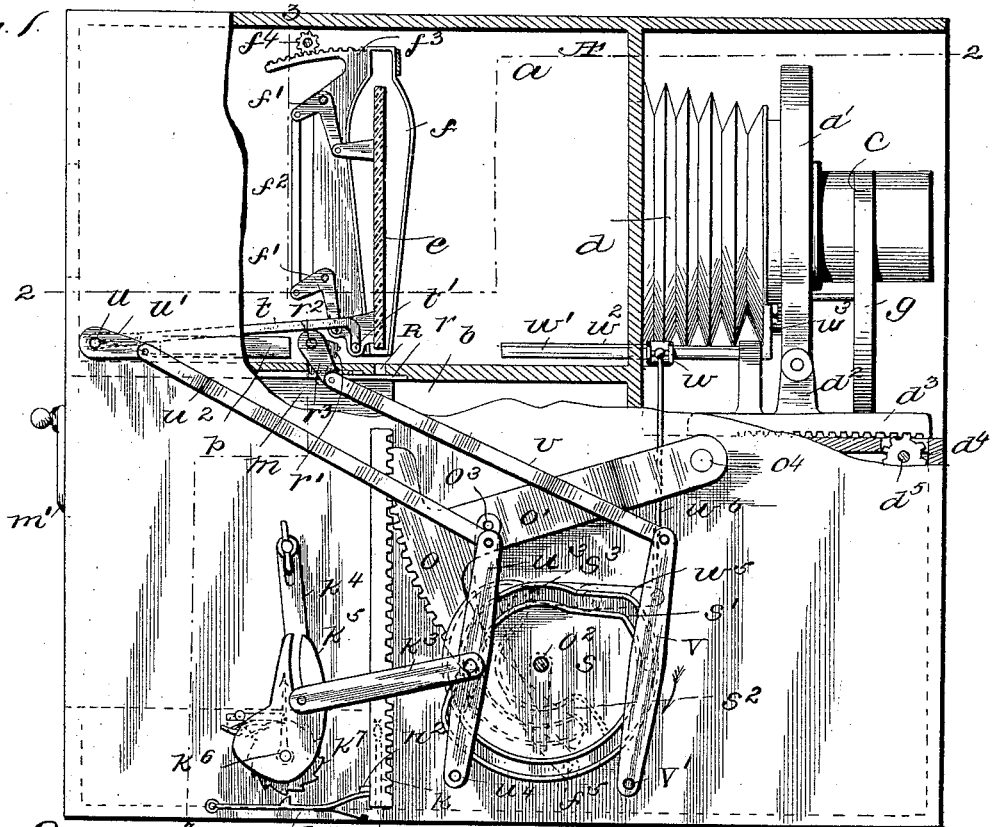
Figure 2:
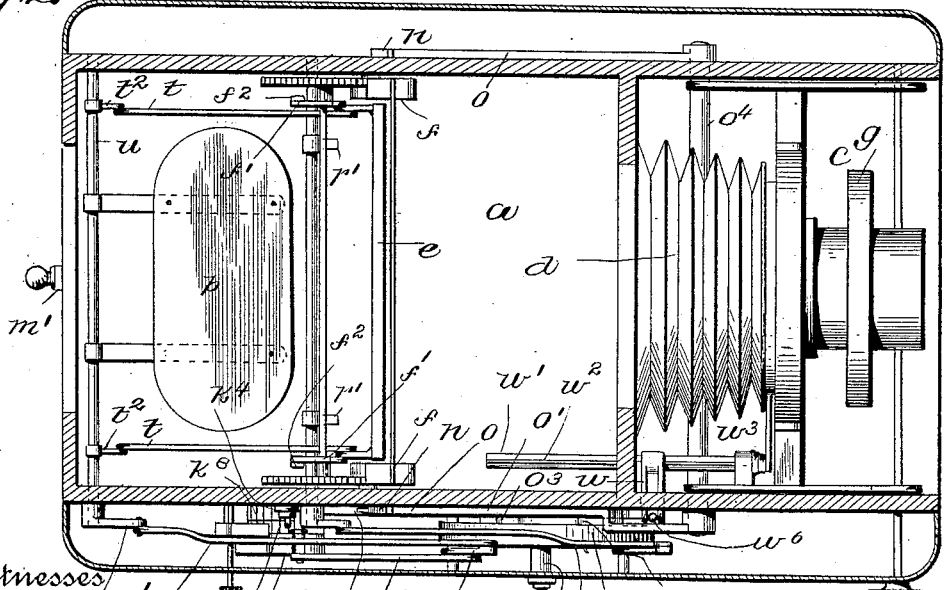

Figure 1 is a side elevation of my improved camera, partly in section. Fig. 2 is a horizontal section on the line 2, 2, of Fig. 1. Fig. 3 is a vertical section on the line 3—3 of Fig. 1. Fig. 4 is a vertical, longitudinal, central section through the magazine and a portion of the camera casing. Fig. 5 is a detail perspective of the ratchet mechanism for feeding forward the magazine. Fig. 6 is a similar view of one of the plate lifters; Fig. 7 a similar view of the shutter operating mechanism; Fig. 8 a plan view of the inner face of the cam that actuates the various parts; Fig. 9 a perspective view of the shutter; Fig. 10 a similar view of the rear end of the magazine holder showing the means for locking said holder in the camera; Fig. 11 a similar view of the magazine; Fig. 12 a plan view of the locking nut; Fig. 13 a horizontal section through the rear end of the magazine holder, the camera casing and the locking mechanism; Fig. 14 a perspective view of the lens holder, the parts being shown detached; Fig. 15 a horizontal section taken through the center of said lens holder; Fig. 16 a front or outer view of the operating cam; Fig. 17 a central cross-section thereof; Fig. 18 a rear or inner view of said cam and the lever for operating the plate lifting mechanism; Fig. 19 a detail elevation of the swing back and ground glass; Fig. 20 a rear elevation of a portion of the mechanism for operating the swing back and ground glass; and Fig. 21 a detail sectional view of a modified form of plate lifting mechanism.

Referring to the drawings the reference letter A indicates the camera casing divided into an upper compartment $a$ and a lower compartment $b$, the upper compartment $a$ containing the lens holder $c$, the bellows $d$, ground glass $e$, and swing back $f$, and the lower compartment containing the magazine and its holder. The plates to be exposed are, before being placed in the magazine, inserted in any suitable form of holders each open upon one side, or that side intended to face the lens, but for the sake of brevity the holders will hereinafter be disregarded in the description.

$h$ indicates the magazine consisting of a rectangular box of the proper size to receive the plates when stood on edge and is provided upon its opposite interior sides with cleats $h'$ forming grooves within which the plates rest. The sides of the magazine $h$, between the cleats $h'$ are provided with vertical slots $i$, as clearly shown in Fig. 4, and for the purpose hereinafter specified, and said magazine is open at its top, as shown, for the insertion and removal of the plates and to permit of their transfer and return before and after exposure.

The magazine $h$ is fitted light tight within a holder consisting of a rectangular box $m$ open at one end and of the proper size to permit the magazine $h$ to be fitted snugly therein. To the rear end of the magazine $h$ is rigidly secured a stem $h^2$ provided with a coarse pitched screw thread which at its opposite ends is parallel for a short distance, preferably about one-fourth of the circumference of the stem. Fitted in a socket $m^2$ in the rear end of the magazine holder $m$ is a nut $m'$ provided with one or more interior projections $m^5$ that engages the screw thread in the stem $h^2$, and said nut is provided with a peripheral cam groove $m^3$ within which rest the adjacent ends of two locking pins $m^4$, the outer ends of said pins resting in perforations in the side walls of the magazine holder $m$ and adapted to engage recesses $b^2$ formed in the camera casing at points opposite said perforations. Suitable springs are provided to retract the locking pins $m^4$.

When the magazine $h$ has been filled with plates it is inserted in the holder $m$ and the nut $m'$ is turned. The nut being in engagement with the threaded stem $h^2$ the magazine $h$ is drawn into the holder $m$ and is held therein light tight. The magazine and holder may be now placed within the camera, after which the nut $m'$ is given a partial turn, the parallel or straight portion of the thread of the stem $h^2$ permitting this without affecting the magazine, which causes the cams $m^3$ to project outward the locking pins $m^4$ and cause them to engage the recesses $b^2$ in the camera casing, thereby locking the magazine holder in position therein. Within the lower compartment $b$ of the camera, and beneath the holder $h$, are arranged two sliding racks $k^2$ adapted to be actuated by pinions $k^9$, and to the forward ends of said racks are secured spring or pivoted arms $k''$ projecting upward and notched at their extreme ends, as clearly shown in Fig. 4. To the forward lower edge of the magazine $h$ is fastened a strip $k'$ which is adapted to engage the notched ends of the arms $k''$.

After the magazine and holder have been inserted in the camera, and preparatory to making the first exposure, the nut $m'$ is turned thus moving forward the magazine within its holder a short distance until the strip $k'$ engages the notched arms $k''$, thus connecting the racks $k^2$ to the magazine. When this has occurred the stem $h^2$ will have left or become disengaged from the nut $m'$, as shown in Fig. 4. The magazine is now in the proper position to be moved forward to expose the first plate, the mechanism for accomplishing which I will now proceed to describe.

To one side of the camera casing is pivoted a cam disk S provided upon its outer face with an irregular shaped cam groove $s'$ within which rests a pin or stud carried by a lever $u^3$ pivoted to the camera casing at $u^4$, and to said lever is pivoted one end of a link $k^3$, the other end of said link being pivotally secured to a suspension link $k^4$ adjustably secured at its upper end to the side of the camera, the pivot pin connecting said links resting within a forked crank $k^5$ loosely mounted on the shaft $k^6$ carrying the pinions $k^9$ before described. By making the link $k^4$ adjustable the rocking movement of the crank $k^5$ may be adjusted to move the magazine $h$ the proper distance at each operation, as will hereinafter appear. Upon the shaft $k^6$, adjacent to the crank $k^5$ are rigidly mounted two reversely formed ratchet wheels $k^7$, $k^8$, and to the inner face of said crank are pivoted a gravity pawl $k^{13}$ and spring pawl $k^{12}$ each of which engages the teeth of the ratchet wheel $k^7$, and which may be simultaneously thrown out of engagement therewith by means of a small bar $k^{14}$ carried by a rod $k^{15}$ which projects through the side of the camera within reach of the operator. The ratchet wheel $k^7$ operates to move forward the magazine, while the wheel $k^8$ is for the purpose of holding the magazine against accidental displacement, a spring tooth $k^{10}$ engaging the teeth of the wheel $k^8$ and normally operating to prevent the forward movement of the magazine, but is automatically disengaged from said ratchet wheel by a lug $n^2$ carried by a rack $n$ to permit such movement prior to the exposure of each plate, as will be hereinafter described.

The operation of the mechanism for feeding forward the magazine is as follows: The magazine having been given its initial movement by turning the nut $m'$, as before described, is now in position to be moved forward into position to present the first plate to the mechanism for transferring it to the compartment $a$ for exposure. By turning the cam disk S the lever $u^3$ is rocked upon its pivot and, by means of the link $k^3$, first rocks the cam $k^5$ toward the rear of the camera, the pawls $k^{12}$ and $k^{13}$ slipping idly over the teeth of the wheel $k^7$, the said cam is next rocked forward, the pawls engaging the teeth of the ratchet wheel and turning the shaft $k^6$ and consequently rotating the pinions $k^9$, thus feeding forward the magazine $h$ to bring the first plate into operative position. In the partition separating the compartment $a$ from $b$ is a transverse slot R through which the plates are raised, said slot being normally closed by a slide $r$ provided upon its upper side with rack teeth which are engaged by toothed segments $r'$ mounted on a shaft $r^2$ journaled in the sides of the camera and provided with a crank $r^3$ to which is connected one end of a link $v$, the other end thereof being connected to the free end of a lever V pivoted at its lower end, as at V' to the side of the camera and provided midway its length with a pin or stud engaging the cam groove $s'$ in the cam disk S by which latter the lever V is oscillated. As the lever V is rocked toward the rear of the camera the link $v$ and crank $r^3$ oscillate the toothed segments $r'$ rearwardly, thus withdrawing the slide $r$ from under the slot R to permit the upward passage of the plate, for lifting which into position for exposure I provide the following mechanism.

$o, o$, indicate two toothed segments mounted on a shaft $o^4$ and gearing with racks $n, n$, that at their lower ends are provided with inwardly projecting arms $k$ that are adapted to engage the under sides of the plates to lift them from the magazine, vertical slots $i$ being formed in the sides of the magazine $h$ and similar slots $i'$ being formed in the sides of the compartment $b$ of the camera to permit the passage of said arms $k$. To the arm $o'$ of one of the segments $o$ is pivoted one end of a lever $o^3$ (see Fig. 18) the other end of said lever being pivoted to the cam disk S by means of a pivot pin $f^5$. When the cam disk S is rotated the lever $o^3$ swings upward the segments $o$ thus raising the racks $n$ and by means of the arms $k$ raises the plate up through the slot R into position for exposure, the ground glass making way for the plate in the manner which I will now proceed to describe.

$e$ indicates the ground glass carried in a suitable frame $e'$ (see Fig. 19) provided with rearwardly projecting lugs $e^2$, $e^3$, which are pivotally connected with bell crank levers $f'$, $f'$, the latter being connected or coupled together by a link $f^2$.

$f$ indicates the swing back pivotally secured at the bottom to the sides of the camera and provided upon its upper edges with toothed segments $f^3$ which are engaged by pinions $f^4$ mounted on a shaft $f^6$ which projects through one side of the camera within reach of the operator. The swing back may thus be adjusted to take in more or less foreground in the usual manner. The lugs $e^3$ of the frame $e'$ carrying the ground glass are pivoted to the swing back $f$, so that the ground glass will follow and move with the swing back. To said lugs are connected the rods $t$ which at their other ends are connected to crank arms $t^2$ mounted on a transverse shaft $u$, to one end of which is connected a crank $u'$ connected by a link $u^2$, the other end of the latter being pivotally connected to the free end of the lever $u^3$ before described.

The rear wall of the compartment $a$ is provided with a view aperture closed by a shutter $p$, said shutter being mounted upon the shaft $u$ above mentioned. As the cam disk S is rotated to retract the slide $r$, the lever $u^2$ and crank $u'$ rock the shaft $u$ and simultaneously close the shutter $p$ and draw back the ground glass $e$, leaving the way clear for the reception of the plate.

The mechanism for focussing the lens and making the exposure now remains to be described. The front board $d'$ of the bellows is carried on a reciprocating carriage $d^2$ provided upon its under side with racks $d^3$ with which engage pinions $d^4$ mounted on a shaft $d^5$ by means of which the front board carrying the lens may be moved backward and forward to obtain the proper focus. The front board is provided with an annular flange $d^6$ provided upon its periphery with notches $d^7$ for the reception of the pins $d^8$ on the lens tube $d^9$. The lens is inserted within the flange $d^6$ and the lens tube $d^9$ fitted therein, the pins $d^8$ resting in the notches $d^7$ and preventing the tube turning. A sleeve $d^{10}$ is fitted over the flange $d^6$ and may be partially rotated thereon by means of slots through which pass the pins that secure it to the flange, said sleeve being provided with recesses $d''$ that permit of the passage of the pins $d^8$. After the lens and tube have been placed in position the sleeve is given a partial rotation, thus locking all the parts firmly together.

The mechanism for making the exposure consists as follows.

$g$ indicates the shutter provided with an aperture $g^2$ adapted to register with the lens tube, and is provided with a shaft $g^3$ carrying a pinion $g^4$. A bar $w^4$ carrying a toothed rack engages said pinion and said bar is pivoted to one end of a crank $w^3$ rigidly secured to one end of a rock shaft $w'$. Said rock shaft is provided with a spline $w^2$ and mounted thereon and engaging said spline is a crank arm $w$, said crank arm thus being incapable of an oscillating movement independent of the shaft $w'$, but permitting a longitudinal movement of said shaft to focus the lens. To the crank $w$ is pivotally secured one end of a rod $w^6$ the other end of which is similarly secured to one end of a lever $w^5$ pivoted at its center and provided at its other end with a pin $s^3$ that rests in a cam race $s^2$ formed on the rear face of the cam disk S. To operate the shutter the cam disk S is turned in the direction shown by the arrow in Fig. 8, when the pin $s^3$ will traverse the outer groove of the cam race without affecting the lever $w^5$ until said pin arrives at the point $s^6$ when it will be moved over to the point $s^7$ in the inner groove by a spring arm $s^8$ rocking the lever $w^5$, and through the connections before described, will open and close the shutter. Upon reversing the movement of the cam disk, for the purpose hereinafter described, the pin $s^3$ returns to its original position at the end of the cam race $s^2$, a spring switch $s^4$ throwing it into position to again traverse the outer groove.

The different operations have been described as though they were distinct and separate, but it will of course be understood that the mechanism is so timed that each operation will occur at a time predetermined with reference to the other operations that they will all co-operate to produce the desired result. Thus, let it be assumed that the parts are in the position shown in Fig. 1, and that the lens has been adjusted to the proper focus. Upon turning the cam disk S indicated by the arrow in said figure the lever $u^3$, by means of the link $k^3$, will rock the crank $k^5$ toward the rear of the camera, the pawls slipping idly over the teeth of the ratchet wheel $k^7$. As the lever $u^3$ is rocked backward it partially rotates the shaft $u$, thus closing the shutter $p$ and retracting the ground glass $e$. When the pin carried by the lever $u^3$ engages the concentric portion of the groove $s'$ the said lever $u^3$ will cease to be rocked and at the same time the pin carried by the lever V will be engaged by the cam portion of said groove and said lever rocked in the proper direction to retract the slide $r$. During this time the lever $o^3$ has been raising the segments $o$, which in turn raise the racks $n$ and with them the arms $k$, thus raising one of the plates from the magazine, the slide $r$ receding to permit its passage into the compartment $a$ where it occupies the place of the ground glass. Upon continuing to turn the cam disk S the lower end of the lever $o^3$ passes over to the other side of the center of the cam disk and the racks $n$ carrying the arms $k$ commence to descend, and at this time the pin carried by the lever V nears the end of the cam portion of the groove $s'$ and at the proper moment rocks said lever to move the slide $r$ forward, closing the slot R and supporting the plate. In effecting these movements the cam disk S has been given an approximate half revolution and by turning it a slight distance farther the pin $s^3$ of the lever $w^5$ is moved from the outer groove of the cam race $s^2$ to the inner groove as before described, thus opening and closing the shutter and making the exposure. The cam disk S is now turned in the reverse direction and in the initial portion of this movement the shutter $r$ is retracted, the racks $n$ and arms $k$ raised a short distance to receive the plate and then descend carrying with them the plate and returning it to the magazine. As the plate descends into the magazine the lever V is again rocked to close the slide $r$. During these movements the pin of the lever $u^3$ has lain in the concentric portion of the groove $s'$ and hence said lever has not been actuated, but as said pin engages the cam portion of the groove the lever is rocked forward and by means of the link $k^3$ rocks forward the crank $k^5$, which, as before described, moves the magazine forward to bring the next plate into position for transfer to the compartment $a$; at the same time the shutter $p$ is lowered, and the ground glass swung forward into position, upon which the camera is again in readiness.

In Fig. 21 I have shown a modified form of mechanism for raising the plates. As thus constructed I pivot a lever $x$ to the rack $n$, said lever at its upper end being provided with an eye $x^2$ that is adapted to engage a hook $y$ carried by the plate holder $y'$, and is forced into engagement therewith by means of a spring $n'$. As the rack $n$ is raised the plate holder and plate are carried with it by the lever $x$, and as the holder descends to near its lowermost position the lower end of the lever $x$ is engaged by a wedge shaped block $b'$ which disengages said lever from the plate holder.

After all the plates in the magazine have been exposed the pawls $k^{12}$ and $d^{13}$ are disengaged from the ratchet wheel $k^7$ when, by tilting the camera slightly in the proper direction the magazine will drop back into its holder and may then be locked therein by turning the nut $m'$ until the magazine is drawn up snugly within the holder. This will also retract the locking bolts $m^4$, when the magazine held light tight within the holder, may be removed.

Having described my invention, what I claim is—

1. In a magazine camera, the combination with a holder consisting of a rectangular box $m$ open at one end, of a plate magazine consisting of a rectangular box provided upon its opposite sides with grooves for the reception of the plates and open upon its upper side, said magazine being fitted within said holder, and means for locking the magazine in the holder and for locking the holder in the camera, substantially as described.

2. In a magazine camera, the combination of a holder $m$ provided with a revoluble nut $m'$ having cams $m^3$, spring bolts $m^4$ actuated by said cams to lock the holder in the camera, and a magazine $h$ provided with a screw threaded stem $h^2$ adapted to be engaged by said nut, substantially as described.

3. In a camera, the combination of the magazine $h$, the holder $m$, provided with means for locking it in the camera, a sliding rack $k^2$ provided with a hooked arm $k''$, a lug $k'$ carried by said magazine and adapted to engage said hooked arm, a pinion $k^9$ engaging said rack, and mechanism for actuating said pinion, substantially as described.

4. In a camera, the combination with the magazine and its holder, of the rack $k^2$ provided with a hooked arm engaging said magazine, the shaft $k^6$ the pinion $k^9$ gearing with said rack, the ratchet wheel $k^7$ mounted on said shaft, the forked crank $k^5$ carrying a pawl engaging said ratchet wheel, the link $k^3$ adjustably suspended at one end and engaging said forked crank, the rocking lever $u^3$ pivotally connected to said link, and the cam disk S for rocking said lever, substantially as described.

5. In a camera, the combination of the magazine $h$, the rack $k^2$ detachably connected thereto, the shaft $k^6$ carrying a pinion engaging said rack, the ratchet wheel $k^7$ mounted on said shaft, the crank $k^5$ carrying a pawl engaging said ratchet wheel, the shutter $p$ mounted on a shaft $u$ carrying a crank $u'$, the rocking lever $u^3$, the links $k^3$ and $u^2$ respectively connecting the cranks $k^5$ and $u'$ to said lever, and the cam disk S for rocking said lever, substantially as described.

6. In a camera, the combination of the shutter $p$ mounted on the shaft $u$ carrying a crank $u'$, the ground glass $e$ pivotally connected to bell cranks $f'$, $f'$, the rod $f^2$ coupling said bell cranks, the rods $t$ pivotally connected at one end to said ground glass and at the opposite end to cranks $t^2$ carried by the shaft $u$, the rocking lever $u^3$, the lever $u^2$ connected to the lever $u^3$ and to the crank $u'$, and the cam disk S for rocking said lever $u^3$, substantially as described.

7. In a camera, the combination with the swing back $f$ pivoted at its lower end and at its upper end provided with toothed segments $f^3$, and the pinion $f^4$, engaging said toothed segment, of the ground glass $e$ pivotally secured at its lower edge to said swing back and means for moving said ground glass laterally, substantially as described.

8. The combination in a camera divided into an upper and lower compartment by a horizontal slotted partition, of a slide $r$ covering said slot and provided with a rack, a pivoted toothed segment $r'$ engaging said rack, a crank connected with said segment, a pivoted lever V, a cam disk S for rocking said lever, and a link $v$ connecting said lever and crank, substantially as described.

9. The combination in a camera divided into an upper and lower compartment by a horizontal slotted partition, of the laterally movable magazine provided with vertical slots in its side walls, the racks $n$ provided with arms $k$ projecting through said slots in the magazine and engaging the bottom edges of the plates, the toothed segments $o$ engaging said racks, the cam disk S and the link $o^3$ pivoted at one end to one of said segments and at its other end to the cam disk, substantially as described.

10. In a camera, the combination of the adjustable front $d'$, the shutter $g$ mounted on a shaft $g^3$ carrying a pinion $g^4$, a transverse bar $w^4$ connected at one end to a crank $w^3$ and provided at its other end with a rack engaging the pinion $g^4$, a feathered shaft $w'$ longitudinally movable in its bearings, a crank $w$ mounted on said shaft, a pivoted lever $w^5$ connected at one end to said crank by a connecting rod $w^6$, and a cam for rocking said lever, substantially as described.

11. In a camera, the combination with the shutter $g$, the pivoted rocking lever $w^5$, and intermediate connections for causing the rocking lever to rotate the shutter, of the cam disk S provided with a double cam race $s^2$ consisting of two approximately concentric grooves communicating with each other at opposite ends, and at one end provided with a spring switch, and a pin carried by one end of the lever $w^5$ and engaging said cam race, substantially as described.

Dated February 12, 1892.

GEORGE PERCIVAL SPOONER.

Witnesses:
GEORGE C. DOWNING,
8 *Quality Court, London, W. C.*
W. J. NORWOOD,
17 *Gracechurch St., London, E. C.*